United States Patent [19]

Uno et al.

[11] 4,218,956
[45] Aug. 26, 1980

[54] METHOD AND DEVICE FOR CONTROLLING A SHOCK ABSORBER

[75] Inventors: Motoo Uno, Kokubunji, Japan; Hisashi Izumi, deceased, late of Tokyo, Japan, by Reiko Izumi, Junichi Izumi, Seiji Izumi, administrators

[73] Assignee: Hitachi, Ltd., Japan

[21] Appl. No.: 854,640

[22] Filed: Nov. 25, 1977

[30] Foreign Application Priority Data

Nov. 29, 1976 [JP] Japan .............................. 51-142273

[51] Int. Cl.$^2$ ............................ F15B 9/03; F15B 9/09
[52] U.S. Cl. .................................. 91/363 R; 364/118
[58] Field of Search ............ 267/65 D; 364/118, 426; 91/35, 361, 363 R, 363 A

[56] References Cited

U.S. PATENT DOCUMENTS

| | | | |
|---|---|---|---|
| 3,038,449 | 6/1962 | Murphy et al. | 91/363 R |
| 3,295,421 | 1/1967 | McCormick | 91/363 R |
| 3,555,970 | 1/1971 | Borgeson | 91/363 R |
| 3,710,687 | 1/1973 | Rench | 91/363 R |
| 3,873,123 | 3/1975 | Joneleit | 267/65 D |
| 3,893,695 | 7/1975 | Rickert | 364/118 |
| 4,061,295 | 12/1977 | Somm | 267/65 D |
| 4,077,738 | 3/1978 | Keely et al. | 91/361 |

FOREIGN PATENT DOCUMENTS

2653038  5/1977  Fed. Rep. of Germany ........ 91/363 R

Primary Examiner—Martin P. Schwadron
Assistant Examiner—A. Michael Chambers
Attorney, Agent, or Firm—Craig & Antonelli

[57] ABSTRACT

A shock absorber comprising a device for detecting the position and velocity of a moving object; a movement mechanism including a movable part, means for detecting the contact between the movable part and the object, and means for detecting the displacement value of the movable part; and a device for controlling the movement mechanism. With information from the position and velocity detecting device, the control device controls the movement mechanism so that the movable part may move on the course of the object and in the same direction as the moving direction thereof at a velocity corresponding to the velocity of the object. Subsequently, with an information from the contact detecting means, it reduces the velocity of the movable part on the basis of a predetermined deceleration pattern when the object has come into contact with the movable part. Further, with an information from the displacement value detecting means, it executes a positioning control so as to stop the movable part at a predetermined position when the displacement value of the movable part has reached a predetermined value.

13 Claims, 12 Drawing Figures

METHOD AND DEVICE FOR CONTROLLING A SHOCK ABSORBER

BACKGROUND OF THE INVENTION

1. Field of the Invention

This invention relates to a method and device for controlling a shock absorber so as to demonstrate a remarkable shock absorbing effect on objects having a wide range of kinetic energies.

2. Description of the Prior Art

As buffers for absorbing a shock which arises in stopping an object having an inertia, the following shock absorbers have heretofore been employed:
(1) Shock absorber using the elasticity of a material
  (a) Metal spring shock absorber
  (b) Rubber shock absorber
  (c) Air spring shock absorber
  (d) Fluid spring shock absorber
(2) Shock absorber using the viscosity of a fluid
(3) Shock absorber using the dynamic pressure of a liquid
  (a) Constant pressure valve type shock absorber
  (b) Fixed orifice type shock absorber
  (c) Variable orifice type shock absorber
(4) Shock absorber using the frictional force
(5) Shock absorber using the plastic deformation of a metal In any of such prior-art buffers, however, the object having an inertia comes into contact with a movable part for shock absorption and then the movable part is moved, whereby a shock absorbing force develops for the first time. Therefore, in case where the kinetic energy of the object is high, an impact stress at the contact between the object and the movable part becomes very high to adversely affect both the object and the movable part.

The prior-art devices lack in a function for the position control of the object, and therefore have the disadvantage that an accurate position control is impossible. Accordingly, such operations as automatically grasping the object stopped by the movable part and transferring it to another place are impossible.

SUMMARY OF THE INVENTION

An object of this invention is to provide a method and device for controlling a shock absorber wherein a movable part is actively controlled to make it possible to moderate an impact stress at the contact between an object and the movable part irrespective of the magnitude of the kinetic energy of the object and also to accurately perform the position control of the object.

In order to accomplish such an object, according to this invention, the position and velocity of the moving object are detected, and the movable part is accelerated at a velocity corresponding to the detected values; the contact between the object and the movable part is detected, and upon the detection, the movable part is decelerated on the basis of a predetermined deceleration pattern corresponding to the velocity of the object; and further, it is detected that the displacement value of the movable part has reached a predetermined value, and at the detection, the position control is done so that the movable part may stop at a predetermined position.

Hereunder, the embodiments of this invention will be described in detail with reference to the drawings.

DETAILED DESCRIPTION OF THE PREFERRED EMBODIMENTS

Figure 1:
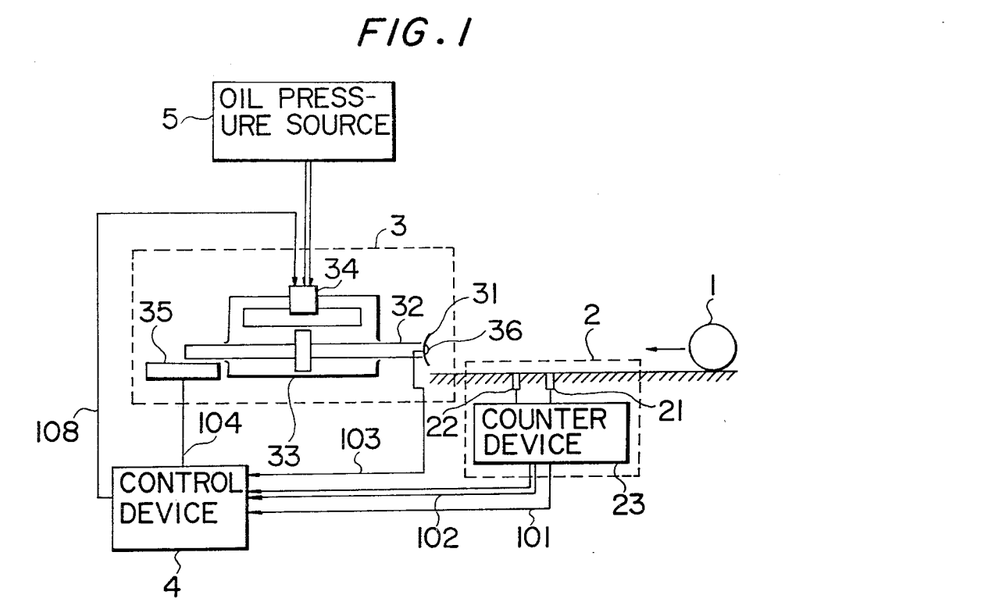
FIG. 1 is a constructional view of an embodiment of a shock absorber according to this invention.

FIG. 1 shows an embodiment of a shock absorber which includes a control device according to this invention. Numeral 1 designates an object which has an inertia and which is moving in the direction of arrow. Numeral 2 designates a detecting device for detecting the transit or passage time and the velocity of the object 1. It consists of sensors 21 and 22 and a counter device 23, and it is arranged at a position of a predetermined distance from a movement mechanism 3 to be described later. The two sensors 21 and 22 whose spacing is set at a fixed distance in advance detect the passages of the object 1 and generate signals, and simultaneously, the counter device 23 measures the period of time required for the object 1 to pass through the interspace between the sensors 21 and 22, whereby the detecting device 2 detects the velocity of the object 1. In this case, the detecting device 2 provides signals 101 and 102 which represent the time of passage of the object 1 through the sensor 21 and the period of time of passage thereof through the interspace between the sensors 21 and 22, respectively.

The movement mechanism 3 consists of a piston 32, a head 31 mounted on the extreme end of the piston and serving to catch the object 1, a detector 36 for detecting the contact between the object 1 and the head 31, an oil hydraulic cylinder 33, a control valve 34 for controlling the movement of the piston 32, and a displacement meter 35 for detecting the displacement value of the piston 32. The movement mechanism 3 is supplied with pressurized oil from an oil pressure source 5. Shown at 4 is a control device, which decides and processes the signals fed from the respective detectors and the detecting device and feeds a command signal 108 to the control valve 34. Signals 103 and 104 are respectively obtained from the detector 36 and the displacement meter 35.

Figure 2:
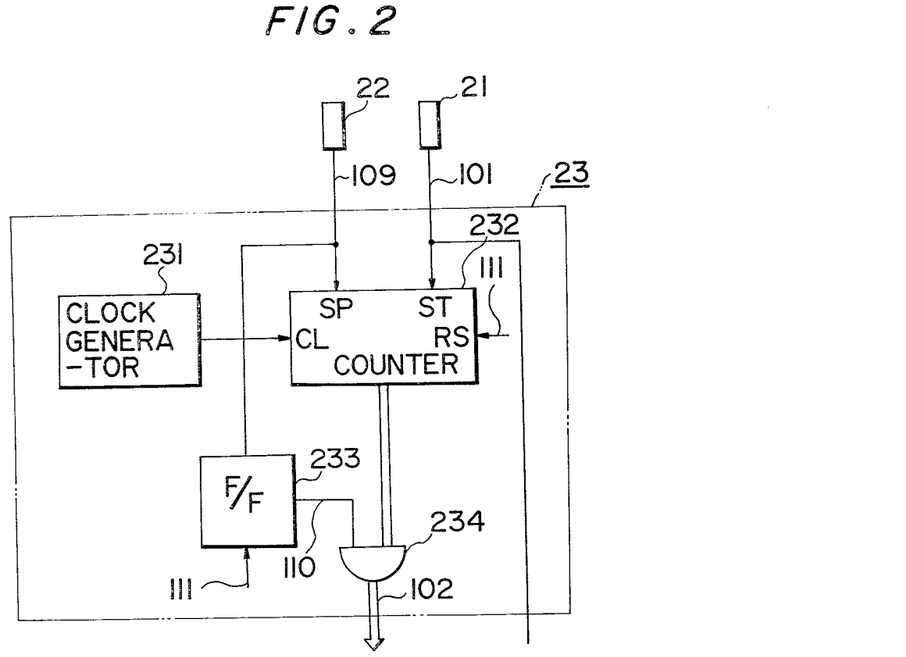
FIG. 2 is a block diagram of an example of a counter device in FIG. 1.

FIG. 2 shows an example of the concrete arrangement of the counter device 23 in FIG. 1. Numeral 231 designates a clock generator, numeral 232 a counter, numeral 233 a flip-flop, and numeral 234 an AND gate.

With such an arrangement, when the object 1 passes through the sensor 21, the detection signal 101 is transmitted to the control device 4. On the other hand, it is supplied to the counter 232, so that the counter 232 begins to count clock pulses from the clock generator 231. Subsequently, when the object 1 passes through the sensor 22, the operation of the counter 232 is stopped by the detection signal 109. Simultaneously therewith, the flip-flop 233 is set, the AND gate 234 is enabled by the output signal 110 thereof, and the count value of the counter 232 at that time is delivered as the velocity signal 102. The counter 232 and the flip-flop 233 are reset by a reset signal 111 to be stated later.

Figure 3:
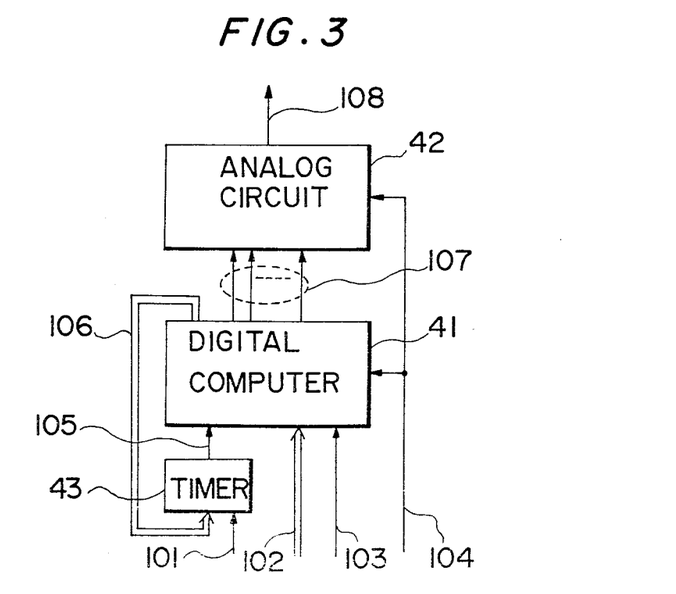
FIG. 3 is a block diagram of an example of a control device in FIG. 1.

FIG. 3 shows an example of the arrangement of the control device 4 illustrated in FIG. 1. It consists of a digital computer 41, an analog circuit 42, and a timer 43. The input signals of the digital computer 41 are the velocity signal 102 from the detecting device 2 in FIG. 1, the contact signal 103 from the detector 36, the displacement signal 104 from the displacement meter 35, and a start signal 105 from the timer 43. The output signals are a timing signal 106 and a parameter signal 107, which are respectively entered into the timer 43 and the analog circuit 42.

The input signals of the analog circuit 42 are the displacement signal 104 from the displacement meter 35 and the parameter signal 107 from the digital computer 41, while the output signal is the command signal 108 to be entered into the control valve 34. The timer 43 starts by receiving the sensor transit signal 101 of the object 1 from the detecting device 2. Upon the establishment of coincidence with the value of the timing signal 106 to be described later, the timer 43 stops and puts the start signal 105 into the digital computer 41.

Figure 4:
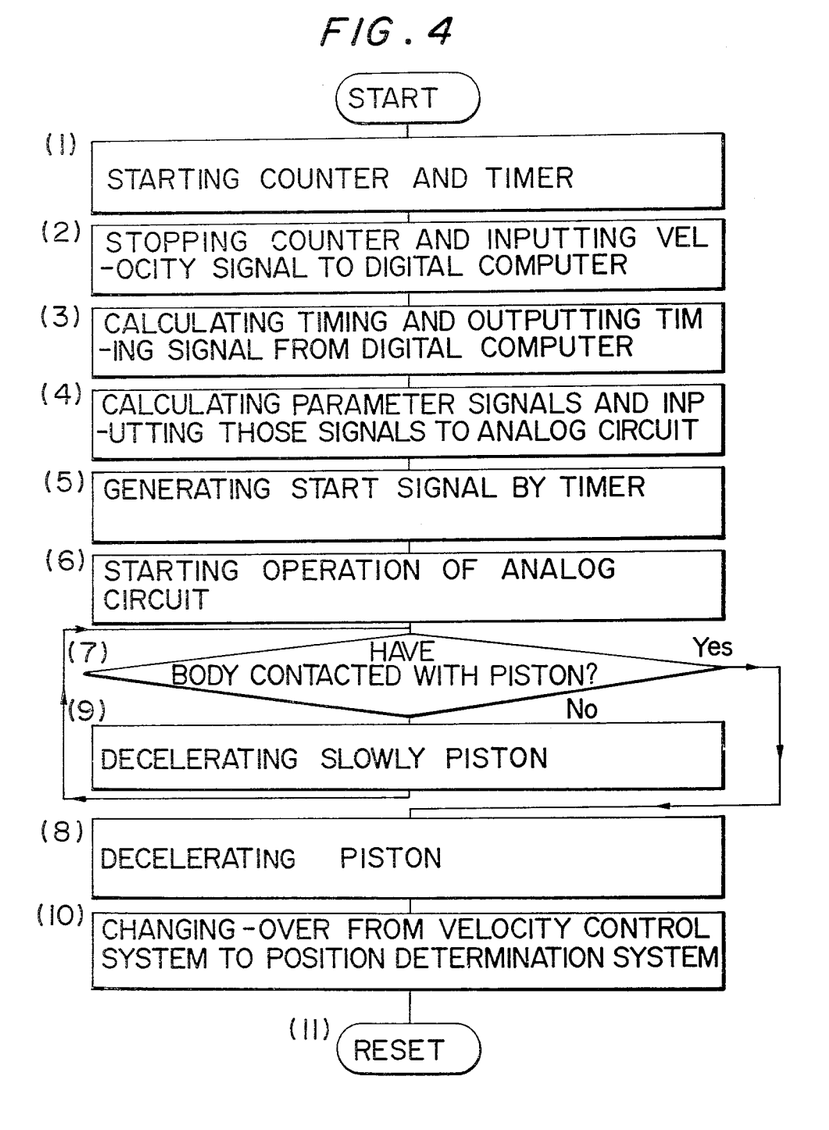
FIG. 4 is a flow chart showing the operating sequence of various devices in FIG. 1.

FIG. 4 shows the operating sequence of the detecting device 2, the control device 4 and the movement mechanism 3. Hereunder, it will be discussed in detail.

(1) When the object 1 passes through the sensor 21, the counter device 23 starts operating, and simultaneously puts the object transit signal 101 into the timer 43, so that the timer starts.

(2) When the object 1 passes through the sensor 22, the operation of the counter 23 stops, and the period of time from the start to the stop of the operation of the counter 23 is put into the digital computer 41 as the velocity signal 102.

(3) Since the distance between the sensors 21 and 22 and the distance between the sensor 21 and the initial position of the head 31 are known, the digital computer 41 computes from these values, an external force to govern the movement of the object 1 and the velocity signal 102 the period of time in which the object 1 passes through the sensor 21 and arrives at a position of a fixed distance from the head 31. The digital computer 41 puts the result into the timer 43 as the timing signal 106. Here, the "external force to govern the movement of the object" signifies the gravitational acceleration, a resistance force, etc. Since these values are determined from the shape and moving direction of the object 1, etc., they are experimentally obtained beforehand.

(4) The digital computer 41 computes several parameter signals 107 from the velocity signal 102, and puts them into the analog circuit 42.

(5) When the start signal 105 is put from the timer 43 into the digital computer 41, the digital computer 41 enters an operation start signal into the analog circuit 42 as one of the parameter signals 107.

(6) The analog circuit 42 starts operations by the operation start signal, generates a velocity pattern of fixed velocity set by some of the parameter signals 107, and delivers the command signal 108 to the control valve 34 as a velocity command value for the movement mechanism 3. Owing to this command signal, the piston 32 is started and accelerated in the same moving direction as that of the object 1 and becomes a velocity somewhat lower than that of the object 1 immediately before the object 1 collides against the head 31.

(7) When the object 1 comes into contact with the detector 36, the contact signal 103 is transmitted from the detector 36 into the digital computer 41. The digital computer 41 puts a deceleration start signal into the analog circuit 42 as one of the parameter signals 107.

(8) Upon receipt of the deceleration start signal, the analog circuit 42 generates a deceleration pattern set by one of the parameter signals 107. It delivers the command signal 108 as a velocity command value for the movement mechanism 3. Owing to this signal, the piston 32 is decelerated.

(9) In case where the object 1 and the head 31 do not yet come into contact after the piston 32 has moved a certain stroke from the commencement of its movement, the digital computer 41 monitors and judges the value of the displacement signal 104 and thereby adjusts some of the parameter signals 107, and it slowly decreases the velocity command value and thereby slowly lowers the velocity of the piston 32.

(10) When the piston 32 comes close to a certain distance from a predetermined command position, the digital computer 41 monitors and judges the value of the displacement signal 104, thereby to change-over the control system from a velocity control system to a position control system through the parameter signals 107 and to make the position control to the command position.

(11) After lapse of a certain time from the stop of the piston 32, the digital computer 41 resets all the devices and returns them to the initial states.

Figure 5:
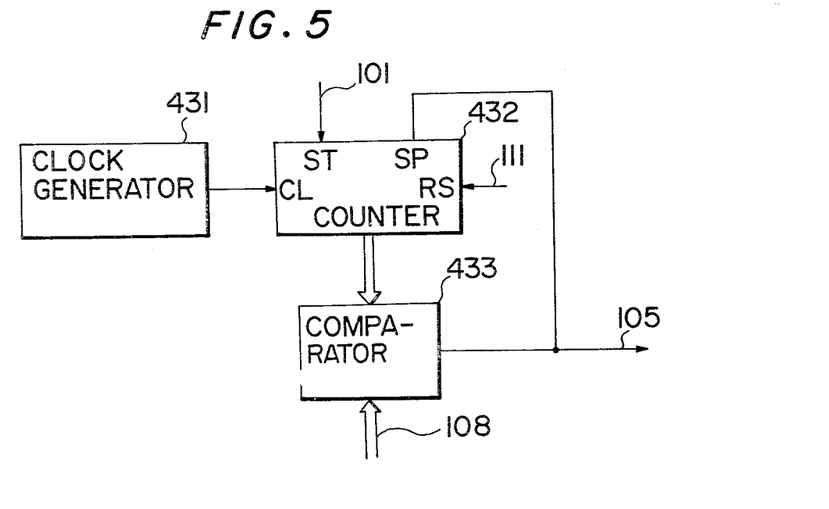
FIG. 5 is a block diagram of an example of a timer in FIG. 3.

FIG. 5 shows an example of the concrete arrangement of the timer 43 in FIG. 3. Numeral 431 designates a clock generator, numeral 432 a counter, and numeral 433 a comparator.

In such an arrangement, the counter 432 counts the clock pulses from the clock generator 431 upon receipt of the transit signal 101 from the counter device 23, and the comparator 433 compares the count value with the timing signal 106 from the computer 41. When both the values coincide, the coincidence signal 105 is put into the computer 41 as the start signal and it stops the counter 432. The counter 432 is reset by the reset signal 111 to be described later.

Figure 6:
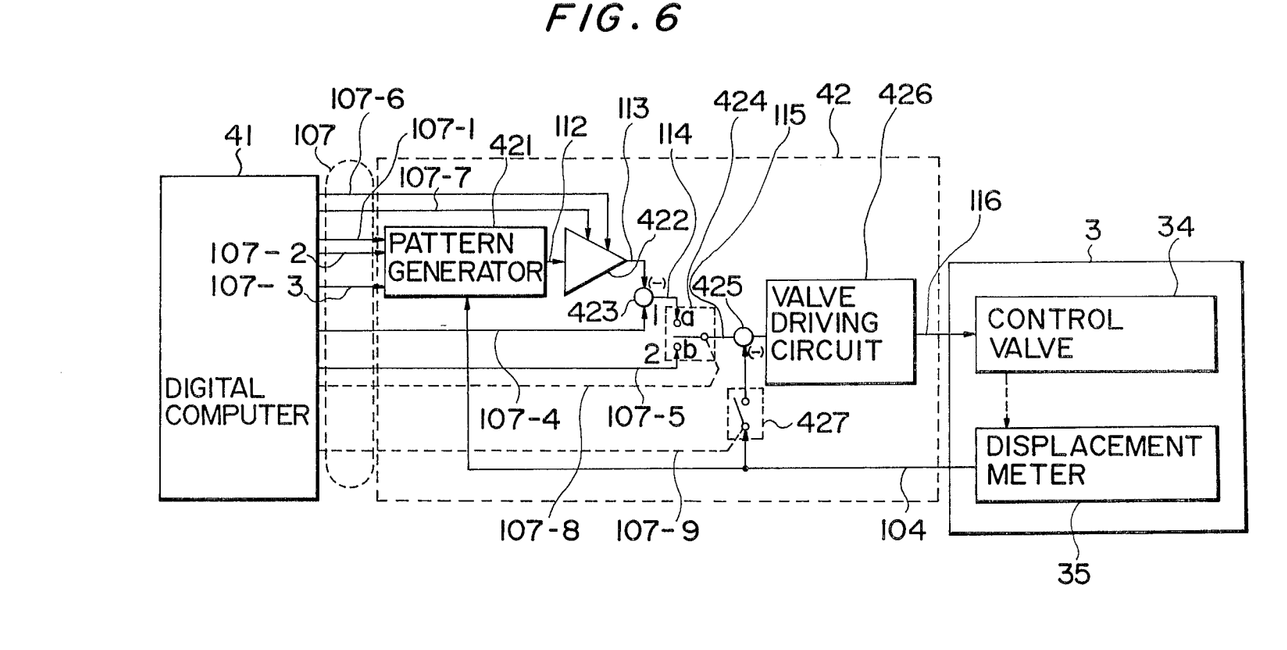
FIG. 6 is a block diagram of an example of an analog circuit in FIG. 3.

FIG. 6 shows an example of the concrete arrangement of the analog circuit 42 in FIG. 3. A pattern generator 421 generates a preset signal pattern with the parameter signals 107-1 to 107-3 from the digital computer 41 and the displacement signal 104 from the displacement meter 35. Outputs 112 from the pattern generator 421 are integrated by an integrator 422, an output 113 from which is subtracted from the initial value signal 107-4 by a subtractor 423 and becomes a velocity command signal 114.

On the other hand, the digital computer 41 delivers the position command signal 107-5 as one of the parameter signals 107. By manipulating a change-over switch 424, the velocity command signal 114 or the position command signal 107-5 is made an input 115 to a control valve driving circuit 426 through a subtractor 425. An output signal 116 from the control valve driving circuit 426 is entered into the control valve 34 of the movement mechanism 3. The control signals 107-6 and 107-7 for resetting and holding the integrator 422, the control signal 107-8 for the change-over switch 424, and the control signal 107-9 for a switch 427 are indicated collectively as the parameter signals 107 in FIG. 3. The details of the operations of the various parts will be explained with reference to the following FIG. 7.

Figure 7:
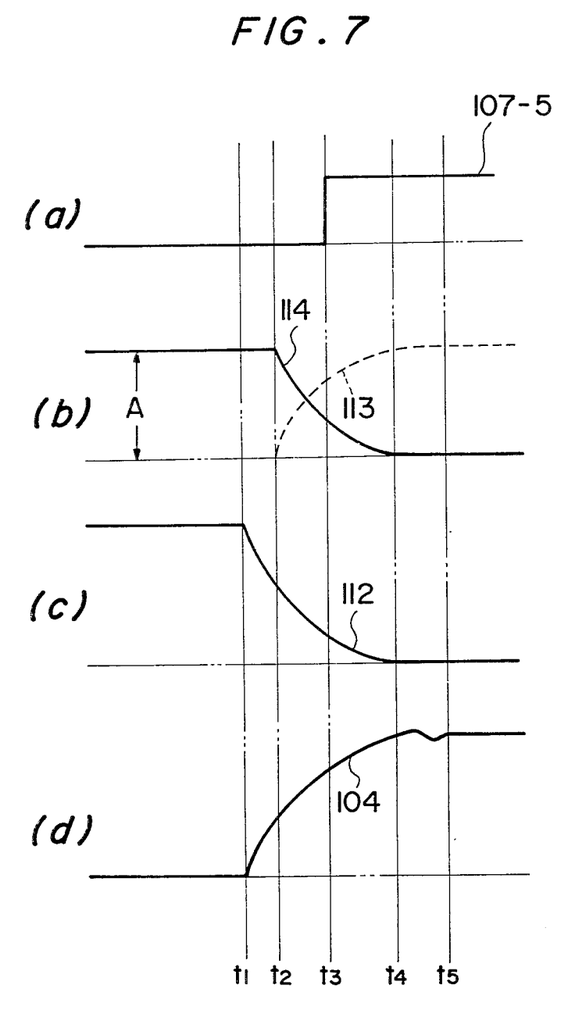
FIG. 7 is a waveform diagram for explaining the operation of the circuit in FIG. 6.

FIG. 7 shows examples of the change-versus-time of the respective signals. In the figure, (a) illustrates the position command signal 107-5. A curve given by a solid line at a part (b) indicates the velocity command signal 114 (a cubic curve), and a curve given by a broken line will be described later. (c) illustrates the output 112 (a parabola) of the pattern generator 421. (d) illustrates the displacement signal 104 from the displacement meter 35 as represents the displacement of the piston 32. Here, the states before a time $t_1$ are the initial states, under which the switch 427 is closed, the switch 424 is connected on the side of a contact b, and the movement mechanism 3 has the position controlled by the position command signal 107-5 and lies in a position control servo system.

First of all, the input signals 107-1 to 107-3 of the pattern generator 421 are set by the digital computer 41 as will be stated later. At the time $t_1$, the digital computer 41 transmits the control signals 107-8 and 107-9 as the operation start signals, to connect the change-over switch 424 onto the side of a contact a and to open the switch 427. Thus, the velocity command signal 114 is entered into the control valve driving circuit 426, and the feedback of the signal 104 from the displacement meter 35 is cut off, whereby the movement mechanism 3 is brought into the velocity control system. In this case, the velocity of the piston 32 is determined by the initial velocity value signal 107-4.

At a time $t_2$, the contact between the object 1 and the head 31 is detected, and the deceleration start signal is entered from the digital computer 41 into the analog circuit 42 as stated previously. Upon receipt of the output signal 107-7, the integrator 422 starts the integration. The integral value is subtracted from the initial velocity value signal 107-4 (that is, the initial value A of the signal 114 illustrated at the part (b)) as the output signal 113 indicated by the broken line at the part (b) in FIG. 7, and the result is entered into the control valve driving circuit 426 as the velocity command signal 114 indicated by the solid line. Subsequently, at a proper time $t_3$ before a time $t_4$, the position command signal 107-5 indicated at the part (a) is set to the value of the final control position again.

When, at the time $t_4$, it is detected that the piston 32 has come to the fixed distance from the command position, the change-over switch 424 is connected onto the side of the contact b, and the switch 427 is closed. Then, the movement mechanism 3 is changed-over from the velocity control system to the position control system and has its position controlled to the command position in the period of time from the time $t_4$ to a time $t_5$.

Figure 8:
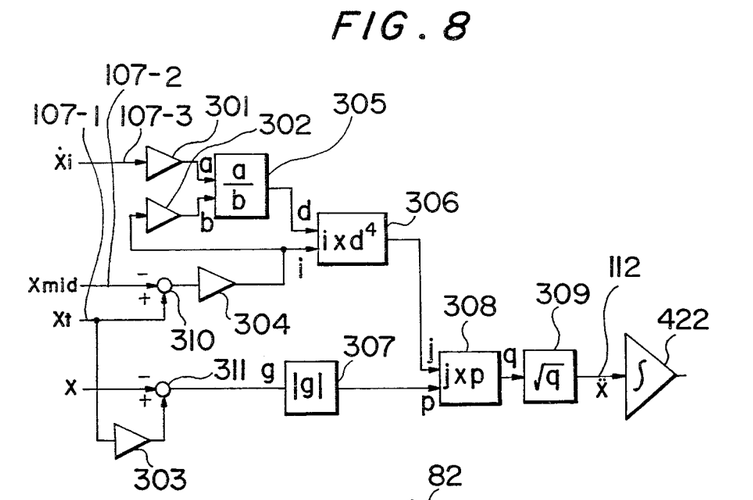
FIG. 8 is a block diagram of an example of a pattern generator circuit in FIG. 6.

FIG. 8 shows an example of the concrete arrangement of the pattern generator 421 in FIG. 6. Amplifiers 301–304 are ones for controlling gains, and components 305 ∝ 309 are function operating elements. Shown at 310 and 311 are subtractors. 107-1 designates a signal $x_t$ representative of the position at which the change-over from the velocity control system to the position control system is done. 107-2 designates a signal $x_{mid}$ representative of the position at which the deceleration start is done. 107-3 designates an initial velocity value signal $\dot{x}_i$, which is the same as the signal 107-4. Shown at 104 is a displacement signal x. In the pattern generator shown in FIG. 8, the following operations are executed:

$$\ddot{x} = \sqrt{2a|x - x_t|}$$

$$a = \dot{x}_i^4/(x_{mid} - x_t)^3$$

By the operations, the following pattern is generated:

$$\ddot{x} = \ddot{x}_{max} - \beta(t - t_2)$$

where $\beta$ is a variable.

Here, $\ddot{x}$ is the signal 112, which is integrated by the integrator 422 into the velocity signal.

Figure 9:
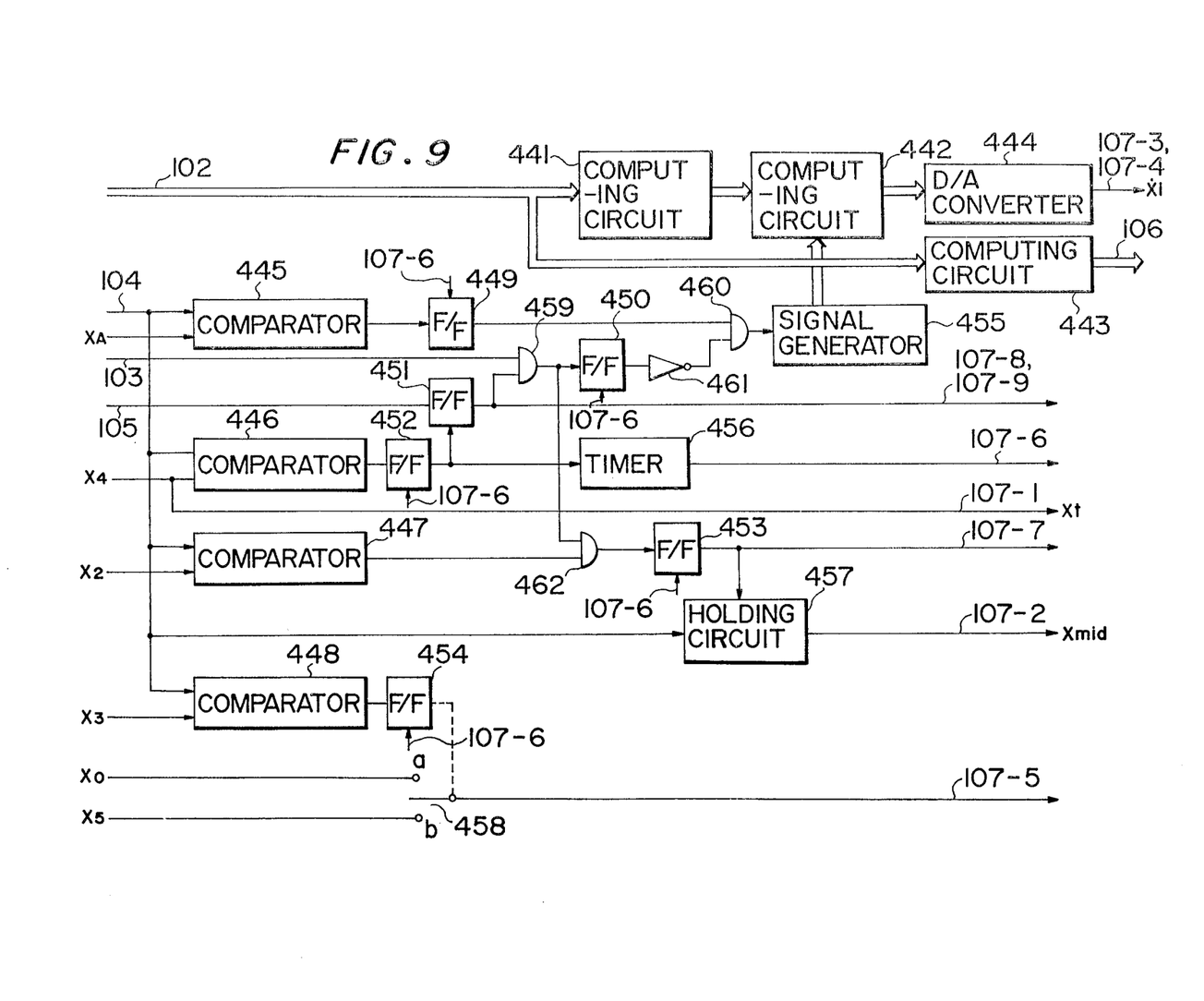
FIG. 9 is a block diagram of an example of a part according to this invention in a digital computer in FIG. 3.

FIG. 9 shows an example of the arrangement of a part according to this invention as constitutes the digital computer 41 in FIG. 3.

In the figure, numerals 441–443 designate computing circuits, numeral 444 a digital-to-analog converter, numerals 445–448 comparators, numerals 449–454 flip-flops, numeral 455 a signal generator, numeral 456 a timer, numeral 457 a holding circuit, numeral 458 a switch, numerals 459 and 460 AND gates, numeral 461 an inverter, and numeral 462 an OR gate.

In such an arrangement, the velocity signal 102, i.e., the period of time $C_v$ required for the object 1 to pass through the interspace between the sensors 21 and 22 (corresponding to the number of clocks from the clock generator 231 as are generated during the period of time) is transmitted from the counter device 23 to the computing circuit 443. Herein, the following timing period of time $C_T$ is evaluated on the basis of the distance $L_1$ between the sensors 21 and 22, the distance $L_2$ between the sensor 21 and the head 31 of the piston, the gravitational acceleration $\alpha$, the clock cycle $t_c$ of the clock generator 231 and the delay time $C_d$ of the movement mechanism 3, all of which are known or set previously:

$$C_T = \phi C_v \pm (C_v/\rho)^2 - C_d$$

where
$\rho = 1/\sqrt{\phi\psi}$
$\phi = L_2/L_1$
$\psi = (\alpha L_2/2L_1^2)t_c^2$ This timing period of time $C_T$ is fed to the timer 43 as the timing signal 106.

On the other hand, the signal 102 is fed to the computing circuit 441. The velocity $V_I$ which is obtained therein by multiplying the inverse number of the input $C_v$ by a predetermined coefficient $C_o$ as given below is fed to the analog circuit 42 as the initial velocity signals 107-3 and 107-4 through the computing circuit 442 and the digital-to-analog converter 444 to be described later.

$$V_I = C_o/C_v$$

Subsequently, when the start signal 105 is entered from the timer 43, the flip-flop 451 is set, the signals 107-8 and 107-9 are fed to the analog circuit 42, the change-over the velocity control system is done, and the piston 32 is moved at the fixed velocity by the initial value velocity signal 107-4. When the object 1 comes into contact with the piston 32 and the detection signal 103 is entered, the AND gate 459 is enabled, the flip-flop 450 is set, and the AND gate 460 is brought into the "on" state. Simultaneously therewith, the flip-flop 453 is set through the OR gate 462, the signal 107-7 is entered into the analog circuit 42, the integrator 422 is rendered operative, and the piston 32 is decelerated.

When the object 1 and the head 31 of the piston 32 do not contact yet even after the piston 32 has started the movement and has been displaced a fixed stroke $x_A$, the output of the comparator 445 is generated to set the flip-flop 449 and to drive the signal generator 455 through the AND gate 460. A signal which increases stepwise with the lapse of time is generated in the signal generator, and is impressed on the computing circuit 442. In the computing circuit 442, the signal of the signal generator 455 is subtracted from the velocity signal from the computing circuit 441. The resultant signal is impressed on the analog circuit 42 through the digital-to-analog converter 444 as the signal 107-4, to slowly decrease the velocity command value.

On the other hand, when the object 1 does not contact with the head 31 of the piston even after the piston 32 has been displaced a fixed stroke $x_2$, the flip-flop 453 is set by the output of the comparator 447, and the deceleration start signal 107-7 is transmitted. Owing to the signal 107-7, the displacement signal 104 from the displacement meter 35 is held in the holding circuit 457, and it is impressed on the analog circuit 42 as the signal 107-2.

Subsequently, when the piston 32 is displaced a fixed stroke $x_3$, the output of the comparator 448 is generated, the flip-flop 454 is set, the switch 458 is changed-over from the a side to the b side, and the velocity command signal 107-5 is changed-over from the initial position signal $x_o$ to a command position signal $x_5$.

When the piston 32 reaches a position (stroke $x_4$) lying at a fixed distance on this side of the command position, the output of the comparator 446 is generated, and the flip-flop 452 is set. Then, the flip-flop 451 is reset, and the signals 107-8 and 107-9 are inverted, so that the velocity control system is changed-over to the position control system. Upon lapse of a fixed time after the set of the flip-flop 452, the reset signal 107-6 is provided from the timer 456. This signal is fed to the analog circuit 42, while it is employed as the resetting signals of the flip-flops 449, 450 and 452-454 within the computer 41. Further, it is used as the reset signals 111 of the counters and flip-flops of the counter device 23 and the timer 43 described earlier.

The computing circuits 441-443 themselves can be easily realized by combining various operating elements.

In the above embodiment, the digital computer 41 has been exemplified as having the special-purpose hardware. Needless to say, however, the various steps can be processed with a program by the use of a general-purpose computer.

Using the control device set forth above, a smooth velocity control and an accurate position control become possible.

Figure 10:
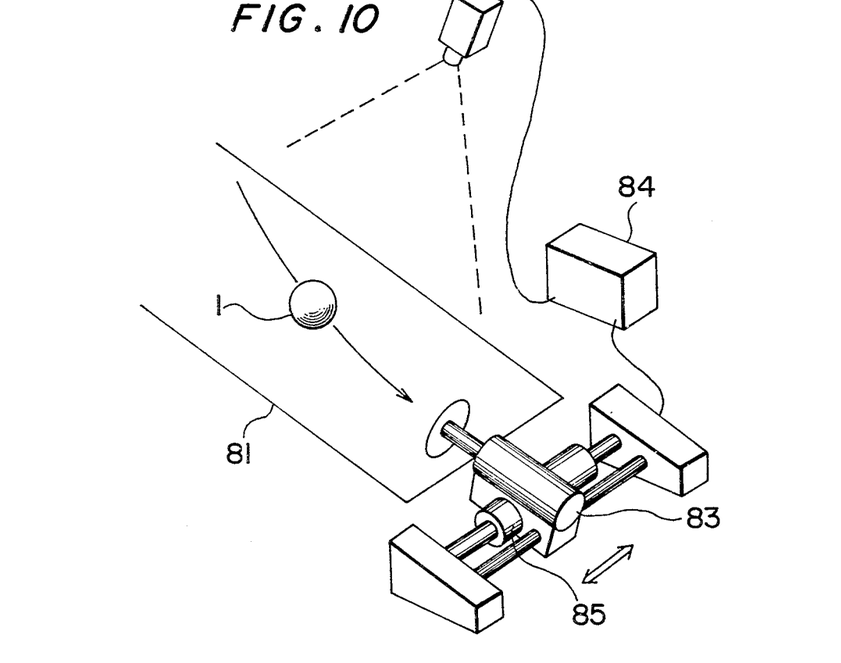
FIGS. 10 to 12 are perspective views each showing the schematic construction of another embodiment of the shock absorber according to this invention.
Figure 11:
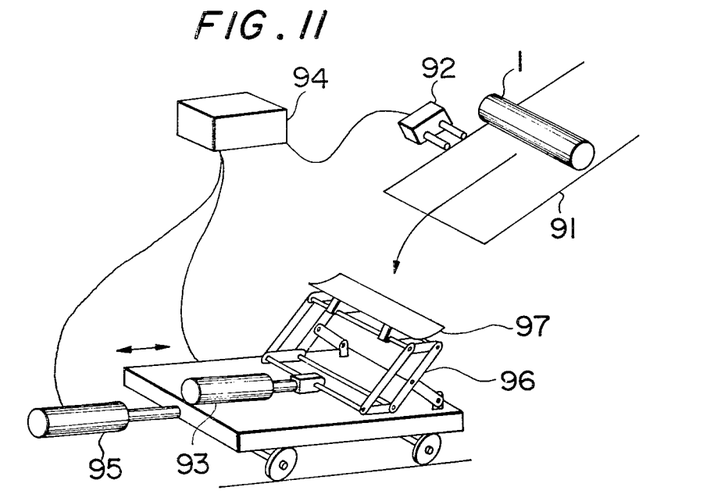
Figure 12:
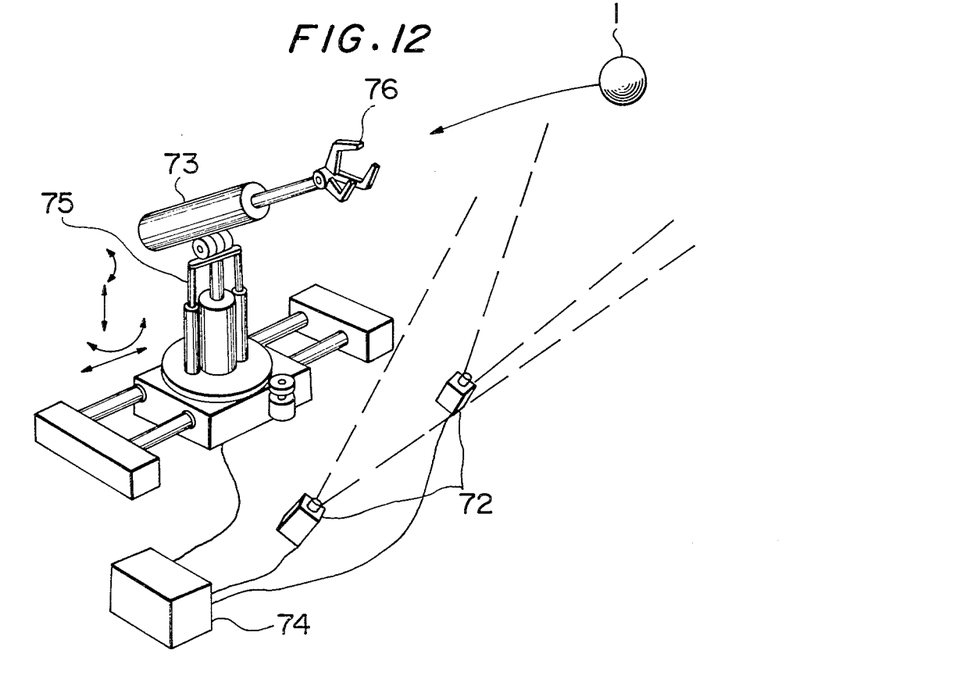

The constructions of further embodiments of the shock absorber according to this invention are shown in FIGS. 10 to 12.

FIG. 10 illustrates a shock absorber wherein the position and velocity of an object 1 moving on a flat surface 81 are detected by a two-dimensional displacement and velocity detecting device 82 such as television camera and wherein the object is stopped without any impact. Although a movement mechanism 83 is the same as the movement mechanism 3 shown in FIG. 1, it has its position in the lateral direction controlled by a position control device 85. Besides the functions of the control device 4 shown in FIG. 1, a control device 84 has the function of computing the path of the object 1 on the basis of the position and velocity signals thereof entered from the two-dimensional displacement and velocity detecting device 82 and then putting a command value into the position control device 85. In this embodiment, the invention is expanded to two dimensions. The computation of the path of the object 1 can be carried out with a digital computer.

FIG. 11 illustrates a shock absorber wherein the position and velocity of an object 1 moving on a flat surface 91 are detected by a detecting device 92 which is based on the same principle as that of the detecting device 2 in FIG. 1 and wherein the object is stopped without any impact. Although a movement mechanism 93 is the same as the movement mechanism 3 shown in FIG. 1, it has its position in the longitudinal direction controlled by a position control device 95. In addition, the moving direction of the movement mechanism 93 is converted through a linkage 96 so as to drive a grasping device 97 which corresponds to the head 31 in FIG. 1. Besides the functions of the control device 4 shown in FIG. 1, a control device 94 has the function of computing the position of contact between the object 1 and the grasping device 97 from the velocity signal of the object 1 entered from the detecting device 92 and then putting a command signal into the position control device 95. Also in this embodiment, the invention is expanded to two dimensions as in the previous embodiment of FIG. 10. The computation of the path of the object 1 can be executed with a digital computer.

FIG. 12 shows a shock absorber wherein the position and velocity of an object 1 moving in mid-air are detected by two, two-dimensional displacement and velocity detecting devices 72 and wherein the object is grasped and stopped by a grasping device 76 without any impact. Although a movement mechanism 73 is the same as the movement mechanism 3 shown in FIG. 1, it has its position and direction controlled by a position control device 75 having four degrees of freedom. Besides the functions of the control device 4 shown in FIG. 1, a control device 74 has the function of computing the path of the object 1 from the position and velocity signals thereof entered from the two, two-dimensional displacement and velocity detecting devices 72 and then putting a command signal into the position control device 75. In this embodiment, the invention is expanded to three dimensions. The computation of the path of the object 1 can be performed with a digital computer.

As described above in detail, according to this invention, the position and velocity of an object are detected, and the velocity of a piston is controlled in correspondence with the values, whereby the adjustment of a shock absorbing force and the position control can be conducted. The effect is very great in enhancing the function of a shock absorber.

The "shock" described in this specification is not restricted to the conventional shock absorber as a buffer, but it signifies every device for receiving and stopping a moving object without any shock.

What is claimed is:

1. In a shock absorber having a movable member which comes into contact with a moving object, a control method for at least moderating an impact stress upon contact of the movable member and moving object comprising the steps of first detecting a position and a velocity of the moving object, moving said movable member in a direction of movement of the moving object and at a velocity in accordance with the detected position and velocity of the moving object, detecting contact between the object and said movable member, decelerating said movable member upon the detection of the contact, detecting that an amount of movement of said movable member has reached a predetermined amount of movement, and controlling the position of said movable member at the detection that the amount of movement has reached the predetermined amount of movement so as to stop said movable member at a predetermined position.

2. A method for controlling a shock absorber as defined in claim 1, further comprising detecting that said movable member does not contact the object even when said movable member has exceeded a first preset amount of movement, and decelerating said movable member upon the detection that said movable member has not contacted the object.

3. A method for controlling a shock absorber as defined in claim 1, wherein said movable member is a piston.

4. A method for controlling a shock absorber as defined in claim 1, wherein said shock absorber consists of oil hydraulic means for moving said movable member, and valve means for controlling said oil hydraulic means.

5. A method for controlling a shock absorber as defined in claim 1, which further comprises the step of computing a predetermined timing period of time in correspondence with the detected position and velocity of the moving object, and in which the step of moving said movable member includes moving said movable member upon lapse of the predetermined timing period of time.

6. A method for controlling a shock absorber as defined in claim 1, wherein the step of controlling the position of said movable member includes detecting that said movable member has moved to a preset amount of movement, setting a command position of said movable member upon the detection movement to the preset amount, and stopping said movable member at the set command position.

7. In a shock absorber having a movable member which comes into contact with a moving object, a control device for at least moderating an impact stress upon contact of the movable member and the moving object comprising first means for detecting a position and a velocity of the moving object and providing an output indicative thereof, second means for detecting contact between the object and said movable member and providing an output indicative thereof, third means for detecting a displacement value of said movable member and providing an output indicative thereof, and fourth means being responsive to the output of said first means for controlling said movable member to move said movable member in a direction of movement of the object at a velocity in accordance with the output of said first means, being responsive to the output of said second means for decelerating said movable member upon the detection of contact by said second means, and being responsive to the output of said third means for stopping said movable member at a command position when the detected displacement value of said third means has exceeded a predetermined value.

8. A device for controlling a shock absorber as defined in claim 7, wherein said fourth means comprises digital computation means receiving signals from said first, second and third means and for generating a timing signal and parameter signals, timer means for generating a start signal upon lapse of a period of time corresponding to said timing signal, and analog circuit means for generating signals for controlling the movement of said movable member, on the basis of a signal from said third means and said parameter signals from said digital computation means.

9. A method for controlling a shock absorber including a movable member arranged for at least contacting a moving object having kinetic energy, the method comprising the steps of first detecting the position and velocity of the moving object, moving the movable member in a direction of movement of the moving object in response to the detected position and velocity of the moving object, detecting contact between the moving object and the movable member, and decelerating the movable member in response to the detected contact, and further comprising the steps of detecting that an amount of movement of the movable member has reached a predetermined value, and controlling the movement of the movable member in response to the detection of movement of the movable member reaching the predetermined value so as to stop the movable member at a predetermined position.

10. A method for controlling a shock absorber as defined in claim 9, wherein the step of moving the movable member includes moving the movable member prior to contact of the movable member and the moving object.

11. A method for controlling a shock absorber according to claim 10, wherein the step of moving the movable member includes moving the movable member so that the movable member has a velocity less than the velocity of the moving object immediately before the moving object contacts the movable member.

12. A control device for controlling a shock absorber having a movable member arranged for at least contacting a moving object having kinetic energy comprising means for detecting the position and velocity of the moving object and providing an output in accordance therewith, means for moving the movable member in a direction of movement of the moving object in response to the output of said position and velocity detecting means, means for detecting contact between the moving object and the movable member and providing an output in accordance therewith, and means for decelerating the movable member in response to the output of said contact detecting means, and further comprising means for detecting that an amount of movement of the movable member has reached a predetermined value and providing an output indicative thereof, and means responsive to the output of said predetermined value detecting means for stopping the movement of the movable member at a predetermined position.

13. A control device as defined in claim 12, wherein said moving means moves said movable member prior to contact between the moving object and the movable member.

* * * * *